US012562084B2

(12) United States Patent
Leadbetter

(10) Patent No.: US 12,562,084 B2
(45) Date of Patent: Feb. 24, 2026

(54) AUGMENTED REALITY WINDOW

(71) Applicant: BAE Systems plc, London (GB)

(72) Inventor: James Hugo Leadbetter, Preston (GB)

(73) Assignee: BAE Systems plc, London (GB)

( * ) Notice: Subject to any disclaimer, the term of this patent is extended or adjusted under 35 U.S.C. 154(b) by 133 days.

(21) Appl. No.: 18/266,137

(22) PCT Filed: Dec. 2, 2021

(86) PCT No.: PCT/GB2021/053145
§ 371 (c)(1),
(2) Date: Jun. 8, 2023

(87) PCT Pub. No.: WO2022/123219
PCT Pub. Date: Jun. 16, 2022

(65) Prior Publication Data
US 2024/0046826 A1 Feb. 8, 2024

(30) Foreign Application Priority Data

Dec. 10, 2020 (GB) .................................... 2019489

(51) Int. Cl.
*G09G 3/00* (2006.01)
*G06F 3/01* (2006.01)
*G06T 7/70* (2017.01)
(52) U.S. Cl.
CPC ............ *G09G 3/001* (2013.01); *G06F 3/013* (2013.01); *G06T 7/70* (2017.01); *G09G 2354/00* (2013.01)
(58) Field of Classification Search
None
See application file for complete search history.

(56) References Cited

U.S. PATENT DOCUMENTS

| | | | |
|---|---|---|---|
| 2013/0249942 A1 | 9/2013 | Green | |
| 2016/0035139 A1 | 2/2016 | Fuchs | |
| 2016/0163108 A1 | 6/2016 | Kim | |
| 2018/0267603 A1 | 9/2018 | Bastian | |

(Continued)

FOREIGN PATENT DOCUMENTS

| | | |
|---|---|---|
| CN | 104272371 A | 1/2015 |
| CN | 105763865 B | 7/2016 |
| CN | 108153502 A | 6/2018 |

(Continued)

OTHER PUBLICATIONS

GB Search Report for Application No. GB2019489.0 mail date May 11, 2021, 4 pages.

(Continued)

*Primary Examiner* — Yi Wang
(74) *Attorney, Agent, or Firm* — Maine Cernota & Curran

(57) ABSTRACT

An apparatus comprises: a display device including an optically transparent display screen for displaying images to a user; a sensor configured to track a viewing direction and/or a viewing position of the user; a detector configured to determine a location of a target viewable by the user through the display screen; and a controller configured to control the display device to display an image on the display screen at screen coordinates corresponding with the viewable target, using the tracked viewing direction and/or the tracked viewing position of the user and the determined location of the target.

19 Claims, 3 Drawing Sheets

(56)  References Cited

U.S. PATENT DOCUMENTS

2019/0244432 A1*  8/2019  Simonsen ............. G02B 30/25
2019/0389069 A1   12/2019  Kalbavi

FOREIGN PATENT DOCUMENTS

| JP | 2012058353 | A | 3/2012 |
| JP | 2013015796 | A | 1/2013 |
| JP | 2019206050 | A | 12/2019 |
| JP | 2020121351 | A | 8/2020 |

OTHER PUBLICATIONS

International Search Report and Written Opinion for PCT Application No. PCT/GB2021/053145 mail date Mar. 11, 2022, 14 pages.

Huang Chun-Yen et al: "A Design of Augmented-Reality Smart Window Using Directive Information Fusion Technology for Exhibitions" Jun. 27, 2019 (Jun. 27, 2019), Advances in Databases and Information Systems; [Lecture Notes in Computer Science; Lect. Notes Computer], Springer International Publishing, Cham, pp. 447-457, XP047513203, ISBN:978-3-319-10403-4 [retrieved on Jun. 27, 2019].
"Lu Shang et al: ""Integrating Eye-Tracking to Augmented Reality System for Surgical Training"", Journal of Medical Systems, Springer US, New York, vol. 44, No. 11, Sep. 29, 2020 (Sep. 29, 2020), XP037273660, ISSN: 0148-5598, DOI: 10.1007/S10916-020-01656-W [retrieved on Sep. 29, 2020]".
"Bolano Gabriele et al: ""Transparent Robot Behavior Using Augmented Reality in Close Human-Robot Interaction"", 2019 28th IEEE International Conference on Robot and Human Interactive Communication (RO-MAN), IEEE, Oct. 14, 2019 (Oct. 14, 2019), pp. 1-7, XP033685954, DOI: 10.1109/ROMAN46459.2019. 8956296 [retrieved on Jan. 10, 2020]".

* cited by examiner

S201

S202

S203

AUGMENTED REALITY WINDOW

RELATED APPLICATIONS

This application is a national phase application filed under 35 USC § 371 of PCT Application No. PCT/GB2021/053145 with an International filing date of Dec. 2, 2021, which claims priority of GB Patent Application 2019489.0 filed Dec. 10, 2020. Each of these applications is herein incorporated by reference, in its entirety, for all purposes.

FIELD OF THE INVENTION

The present invention relates to augmented reality.

BACKGROUND

Generally, augmented reality (AR) relates to an interactive experience of a real-world environment, in which objects in the real-world environment are enhanced by computer-generated perceptual information, typically visual information, in real-time. AR may also be known as mixed reality or computer mediated reality. AR hence combines the computer-generated perceptual information with the real-world environment.

Generally, a conventional AR device includes a processor and a memory, a display, a sensor for determining an orientation of the display and optionally a camera. For example, smart phones and tablet computers may be held (i.e. contact) and used as AR devices by users, in which live video images, acquired by the cameras and displayed on the displays, are overlaid with computer-generated graphics. Head-mounted displays (HMDs), worn (i.e. contact) by users, are similar. AR eyeglasses, also worn by users, may similarly display computer-generated graphics on eyeglass displays or by projection through or reflection off surfaces of the eyeglass lenses.

These conventional AR devices are individual (i.e. for a single user). Hence, a personal AR device is required for each user to experience the AR concurrently. Alternatively, a shared AR device is required for each user to experience the AR consecutively.

Hence, there is a need to improve AR devices.

SUMMARY OF THE INVENTION

It is one aim of the present invention, amongst others, to provide an apparatus and a method which at least partially obviates or mitigates at least some of the disadvantages of the prior art, whether identified herein or elsewhere. For instance, it is an aim of embodiments of the invention to provide an apparatus and a method that provides AR experiences to users communally and/or contactlessly, without requiring individual handheld or wearable AR devices, that overlays computer imagery for a specific tracked user on a large scale by utilising a transparent 'window' as said overlay. This operates in the same principle as head mounted AR devices do, but requires the wearing of no equipment or physical contact with the user whatsoever in order to function. For instance, it is an aim of embodiments of the invention to provide a method that indicates industrial robotic cell status through the projection of individual limb operational status onto the transparent safety screen that surrounds it, tracking the viewer's eye location and respective robot location in order to achieve this method.

A first aspect provides an apparatus comprising:
a display device including an optically transparent display screen for displaying images to a user;
a sensor configured to track a viewing direction and/or a viewing position of the user;
a detector configured to determine a location of a target viewable by the user through the display screen; and
a controller configured to control the display device to display an image on the display screen at screen coordinates corresponding with the viewable target, using the tracked viewing direction and/or the tracked viewing position of the user and the determined location of the target.

A second aspect provides a method of displaying an image to a user, the method comprising:
tracking a viewing direction and/or a viewing position of the user;
determining a location of a target viewable by the user through an optically transparent display screen; and
displaying an image on the display screen at screen coordinates corresponding with the viewable target, using the tracked viewing direction and/or the tracked viewing position of the user and the determined location of the target.

DETAILED DESCRIPTION OF THE INVENTION

According to the present invention there is provided an apparatus, as set forth in the appended claims. Also provided is a method. Other features of the invention will be apparent from the dependent claims, and the description that follows.

Apparatus

A first aspect provides an apparatus comprising:
a display device including an optically transparent display screen for displaying images to a user;
a sensor configured to track a viewing direction and/or a viewing position of the user;
a detector configured to determine a location of a target viewable by the user through the display screen; and
a controller configured to control the display device to display an image on the display screen at screen coordinates corresponding with the viewable target, using the tracked viewing direction and/or the tracked viewing position of the user and the determined location of the target.

In this way, the user may view both the image, displayed on the optically transparent display screen, and the target, through the optically transparent display screen, thereby providing an AR experience for the user. Since the display screen is optically transparent, the user may view the target directly therethrough, without requiring imaging of the target using a camera for example, thereby improving viewing of the target and/or a field of view of the user. Since the viewing direction and/or the viewing position of the user are tracked and since the image is displayed at the screen coordinates based on the tracked viewing direction and/or the tracked viewing position of the user, the screen coordinates of the image are updated or tracked accordingly, for example as the user moves such that the tracked viewing direction and/or the tracked viewing position of the user changes. That is, the image is displayed at screen coordinates that account for relative movement between the user and the display device. Hence, the user is not required to orient the display device so as to experience the AR, since the viewing direction and/or the viewing position of the user is tracked. Similarly, the image is displayed at the screen coordinates based on the determined location of the target, which may also change. That is, the images displayed at screen coordinates that account also for relative movement between display device and the target. Hence, the image is displayed effectively superimposed upon the field of view of the user. For example, the display device may be a static display device, such as installed in a manufacturing facility, a laboratory, or a hospital, and controlled to display images to users viewing targets through the optically transparent display screen. Particularly, the display device is neither wearable nor handheld, not requiring wearing, holding or contact by users. Hence, personal AR devices are not required for each user to experience the AR concurrently while sharing of a shared device is not required for each user to experience the AR consecutively. That is, the number of AR devices is reduced and wearing or holding of AR devices eliminated while sharing, requiring contact and potentially cross contamination, of a single AR device is avoided.

It should be understood that smartphones and tablets do not have optically transparent display screens, as described below, since targets are not viewable by users therethrough. Instead, live video images, acquired by the cameras and displayed on the displays of the smartphones and tablets, are overlaid with computer-generated graphics. In one example, the display device is not a smartphone or a tablet.

It should be understood that HMDs and AR eyeglasses may have optically transparent display screens. However, such a wearable AR device typically determines a viewing direction and/or a viewing position of the AR device, rather than of the user, as described below.

The apparatus comprises the display device, the sensor, the detector and the controller. It should be understood that the controller is communicatively coupled, unidirectionally or bidirectionally as appropriate and wired and/or wirelessly, to the display device, the sensor and the detector. In one example, the display device, the sensor, the detector and/or the controller are physically separate, for example in separate housings, and may be spaced apart. In one example, the display device, the sensor, the detector and/or the controller are integrated, for example in the same housing.

Display Device

The apparatus comprises the display device including the optically transparent display screen for displaying the images to the user.

In one example, the display screen comprises and/or is a see-through display. A see-through display is a term of the art and is an electronic display that allows the user to see what is shown on the optically transparent display screen while still being able to see therethrough. See-through displays are known and include LCD and LED (including both inorganic and organic LED such as transparent organic light emitting device, TOLED) display screens. Passive transparent displays are also known. Other see-through displays are known. Such a see-through display may have a transmittance of about 70%.

In one example, the display screen comprises and/or is a projection screen, for example a front projection screen and/or a rear projection screen) and wherein the display device comprises a projector arranged to project the image on the display screen.

In one example, the projection screen comprises and/or is a semi-transparent projection screen having a rear or front projection film or coating or an optical diffusion screen. Such projection screens are typically used for holographic or 'Pepper's Ghost' projection. Such a projection screen may have a transmittance of 80% or more. Suitable projectors are known.

In one example, the projection screen comprises and/or is a beam splitter. In this way, a head-up display (HUD) may be provided. A typical HUD contains three primary components: a projector unit, a combiner, and a video generation computer. The projection unit in a typical HUD is an optical collimator setup: a convex lens or concave mirror with a cathode ray tube, light emitting diode display, or liquid crystal display at its focus, thereby displaying the image where the light is collimated i.e. the focal point is perceived to be at infinity. The combiner is typically an angled flat piece of glass (a beam splitter) located directly in front of the user, that redirects the projected image from projector in such a way that the user may view the field of view and the projected infinity image at the same time. Combiners may have coatings that reflect the monochromatic light projected onto it from the projector unit while allowing all other wavelengths of light to pass through. In some optical layouts, combiners may also have a curved surface to refocus the image from the projector.

In one example, the display screen has a dimension, for example a diagonal dimension, in a range from 0.5 m to 25 m, preferably in a range from 1 m to 10 m, more preferably in a range from 2 m to 5 m. That is, the display screen is relatively large, compared with a display screen of a handheld or wearable AR device.

In one example, the display screen is adapted to provide a safety screen, disposed between the user and the target. In this way, the display screen isolates the user from the target, by providing a barrier therebetween, formed thereby, preventing the user from contacting the target and/or vice versa.

In one example, the display screen encloses, at least in part, the target. For example, the display screen may surround the target on one or more sides, such as encircling the target.

In one example, the display device comprises and/or is a stereo display device (also known as a 3D display device), for example a stereo display device requiring glasses or an autostereoscopic display not requiring glasses, as understood by the skilled person. In this way, the image may be displayed at predetermined depth and/or at a depth corresponding with the viewable target, for example a similar depth. In this way, viewing of the displayed by the user is facilitated, since the user may focus on the target and the image, for example simultaneously.

Sensor

The apparatus comprises the sensor configured to track the viewing direction and/or the viewing position of the user. It should be understood that the sensor is configured to track the viewing direction and/or the viewing position of the user, for example the gaze or line of sight thereof. In contrast, handheld and wearable AR devices are configured to track the viewing direction and/or the viewing position of these AR devices. That is, a user of a handheld AR device may be orienting the handheld AR device in a particular direction but viewing in a different direction. Similarly, a user of a wearable AR device may be orienting the wearable AR device in a particular direction but gazing in a different direction. Hence, the apparatus according to the first aspect is responsive to the current viewing direction and/or the current viewing position of the user. In this way, the image displayed by on the display screen is responsive to, for example at screen coordinates and/or generated according to, where the user is looking. In one example, the sensor is configured to track the gaze, the direct vision, the central vision, the para-central vision, the macula vision and/or the line of sight of the user. In one example, the sensor is configured to track the indirect vision (also known as the peripheral vision), the peripheral vision, the mid-peripheral vision and/or the far peripheral vision of the user.

It should be understood that the sensor is configured to track, for example currently, intermittently or continuously, the viewing direction and/or the viewing position of the user. In this way, the screen coordinates of the image and/or the image may be updated according to the tracked viewing direction and/or tracked viewing position, so as to follow where the user is looking and/or movement of the user. In one example, the sensor is configured to track the viewing direction and/or the viewing position of the user by sensing a position of the user's eyes and/or pupils and/or the respective positions of the user's eyes and/or pupils, for example using facial capture, direction of gaze detection and/or eye location software applied to images, for example camera or video images, of the user. Such software is known. Eye location is preferred, requiring a relatively simple camera and having relatively low computer resource requirements compatible with real-time processing, while allowing relatively greater freedom of movement of the user. In contrast, facial capture and/or direction of gaze detection may require relatively complex cameras, suitable lighting and relatively high computer resource requirements.

It should be understood that the sensor is configured to track the viewing direction and/or the viewing position of the user at a resolution, a precision and/or with an accuracy sufficient to calculate screen coordinates for the image, as described below.

In one example, the sensor comprises and/or is a camera, an accelerometer, a gyroscope, a solid state compass, a radio-frequency identification (RFID) detector and/or a positional sensor, for example a global positioning system, GPS. Preferably, the sensor comprises and/or is a camera and suitable software. Suitable sensors include a Microsoft® Azure® Kinect®, VicoVR® available from vicovr.com, Orbbec Astra® available from orbbec3d.com, Stereolabs ZED® available from stereolabs.com and OpenPose® available from github.com/CMU-Perceptual-Computing-Lab/openpose. Other sensors are known.

In one example, the sensor is configured to track respective viewing directions and/or the respective viewing positions of a plurality of users.

Detector

The apparatus comprises the detector configured to determine the location of the target viewable by the user through the display screen.

It should be understood that the target is viewable by the user through the display screen since the display screen is optically transparent. That is, the target is not an image displayed on the display screen but rather, an object on the other side of the display screen with respect to the user. It should be understood that the location of the target comprises and/or is a two-dimensional or a three-dimensional location, that may be absolute or relative to the display screen and/or the user, such as a geographic location, optionally including elevation, or location relative to a coordinate system. It should be understood that the detector is configured to determine the location of the target at a resolution, a precision and/or with an accuracy sufficient to calculate screen coordinates for the image, as described below.

The detector may be as described with respect to the sensor.

In one example, the detector is configured to track the location of the target (and/or more parts thereof), as described with respect to tracking the viewing direction and/or the viewing position of the user by the sensor, mutatis mutandis. Hence, the apparatus according to the first aspect may be responsive to the tracked location of the target. In this way, the image displayed on the display screen may be responsive to, for example at screen coordinates and/or generated according to, the current location of the target.

In one example, the detector comprises and/or is a camera, an accelerometer, a gyroscope, a solid state compass, a radio-frequency identification (RFID) detector, an Ultra-Wideband, UWB, sensor and/or a positional sensor, for example a global positioning system, GPS.

In one example, the detector is communicatively coupleable, for example unidirectionally or bidirectionally and wired or wirelessly, to the target and wherein the detector is configured to determine the location of the target (and/or one or more parts thereof) based on position data received therefrom. That is, the detector may comprise a software sensor (also known as a soft sensor or virtual sensor), configured to read, infer and/or calculate the location of the target (and/or one or more parts thereof) using the position data received therefrom. For example, if the target is an industrial robot or part thereof, the industrial robot may output digital readout (DRO) data including locations of axes.

In one example, the detector is configured to determine respective locations of a plurality of targets (and/or one or more parts thereof) viewable by the user through the display screen. Preferably, said locations are communicated from the said target's (or targets') respective controller to the detector. In other words, direct data feeds in real time from the target(s)' controller on the location of the target(s) (and/or one or more parts thereof) are communicated to the detector. In this way, the present invention advantageously continuously monitors the complex positioning and movement of the target(s) (and/or one or more parts thereof) behind the display device. Preferably, streaming data direct from the target(s)' controller in real time is utilised to ascertain and continually monitor such positions. This functionality is particularly advantageous with regard to complex targets with multiple parts and/or multiple targets.

Target

In one example, the target comprises and/or is industrial, agricultural or medical machinery and/or one or more parts of thereof. Examples of industrial machinery include manufacturing, handling and assembling lines for engineering and construction and chemical process plants. Examples of agricultural machinery include farming equipment and processing. Examples of medical machinery include diagnostic, surgical and therapeutic equipment. In one example, the target is an industrial robot and/or one or more parts thereof, for example an axis (or axes) thereof. In one example, the target comprises and/or is a land craft, watercraft and/or aircraft, for example for road traffic or air traffic management, such as at a bus station, train station or airport. For example, passengers (i.e. users) may view buses (i.e. targets) through the display device at a bus station, which provides a barrier therebetween, and the display device may display associated bus timetables (i.e. images) thereon. In one example, the target comprises and/or is animal, including a human, for security monitoring, sport or hospitality, for example. For example, servers (i.e. users) may view tables and diners (i.e. targets) through the display device at a restaurant, which provides a barrier therebetween, and the display device may display associated orders (i.e. images) thereon. In this way, the user may view the target T (T1 to T5) through the display screen, together with the displayed image.

In one example, the target comprises and/or is an industrial robot or a part thereof. In a preferred example the target(s) is a robot.

In one example, the apparatus comprises the target.

Preferably the target comprises one or more parts thereof, more preferably the target comprises multiple parts thereof. Preferably, the target is a multi-axis robot.

Controller

The apparatus comprises the controller configured to control the display device to display the image on the display screen at the screen coordinates corresponding with the viewable target, using the tracked viewing direction and/or the tracked viewing position of the user and the determined location of the target. It should be understood that the controller is configured to calculate the screen coordinates using the tracked viewing direction and/or the tracked viewing position of the user and the determined location of the target, for example by geometric construction. Such geometric construction is known. Other methods of calculating the screen coordinates are known. In one example, the controller is configured to control the display device to repeatedly, for example intermittently, periodically or continuously, calculate the screen coordinates. In this way, the screen coordinates of the image may be updated according to relative movement of the user and/or the target with respect to the display screen, such that the image is displayed on the display screen at a substantially constant placement relative to the target and the user. That is, as the user and/or the target moves, the image is displayed at updated screen coordinates that account for this movement. It should be understood that the images displayed at the screen coordinates corresponding with the viewable target, for example overlaying the viewable target, adjacent thereto or at a predetermined screen coordinates, for example as viewed by the user having the tracked viewing direction and/or the tracked viewing position.

In one example, the controller is configured to control the display device to display a plurality of images on the display screen at respective screen coordinates corresponding with a plurality of viewable targets and/or one or more parts thereof, using the tracked viewing direction and/or the tracked viewing position of the user and the respective determined locations of the plurality of targets (and/or one or more parts thereof).

In one example, the controller comprises a processor and a memory, for example a computer.

Image

It should be understood that generally, the image is associated with the target, for example computer-generated visual information about the target. In one example, the image comprises and/or is text and/or a graphic, such as an icon, a shape, a picture, a model. In one example, the image is a static graphic. In one example, the image is a dynamic graphic.

Identifier

In one example, the apparatus comprises an identifier configured to establish an identity of the user and the controller is configured to control the display device to display the image based on the established identity. In this way, display of the image may be conditional (i.e. displayed or not displayed) according to the established identity and/or the computer-generated visual information about the target may be specific for the user or a user group thereof. It should be understood that the identifier is thus a sensing element configured to identify the user. For example, the identifier may establish the identity of the user using facial recognition from an image of the user acquired by a camera. For example, the identifier may establish the identity of the user by reading an RFID tag of the user. Generally, the identifier may be as described with respect to the sensor, mutatis mutandis.

User Input Device

In one example, the apparatus comprises a user input device configured to receive an input from the user. In this way, the user may interact with the apparatus.

In one example, the user input device comprises a gesture sensor and/or the display screen comprises a touch screen. In this way, the user may interact with the apparatus using gestures (i.e. non-contact) and/or via touch (i.e. contact or near contact).

In one example, the controller is communicatively coupleable to the target and the controller is configured to control the target according to the input received from the user. In this way, the user may control the target remotely, via the apparatus, for example by gesture and/or touch. For example, the user may view the target through the display screen together with the image displayed thereon and control the target, whilst viewing the target through the display screen together with the image displayed thereon.

Method

The second aspect provides a method of displaying an image to a user, the method comprising:

tracking a viewing direction and/or a viewing position of the user;

determining a location of a target viewable by the user through an optically transparent display screen; and displaying an image on the display screen at screen coordinates corresponding with the viewable target, using the tracked viewing direction and/or the tracked viewing position of the user and the determined location of the target.

The tracking, the viewing direction, the viewing position, the user, the determining, the location, the target, the optically transparent display screen, the image and/or the screen coordinates maybe as described in respect of the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figures 1, 2:
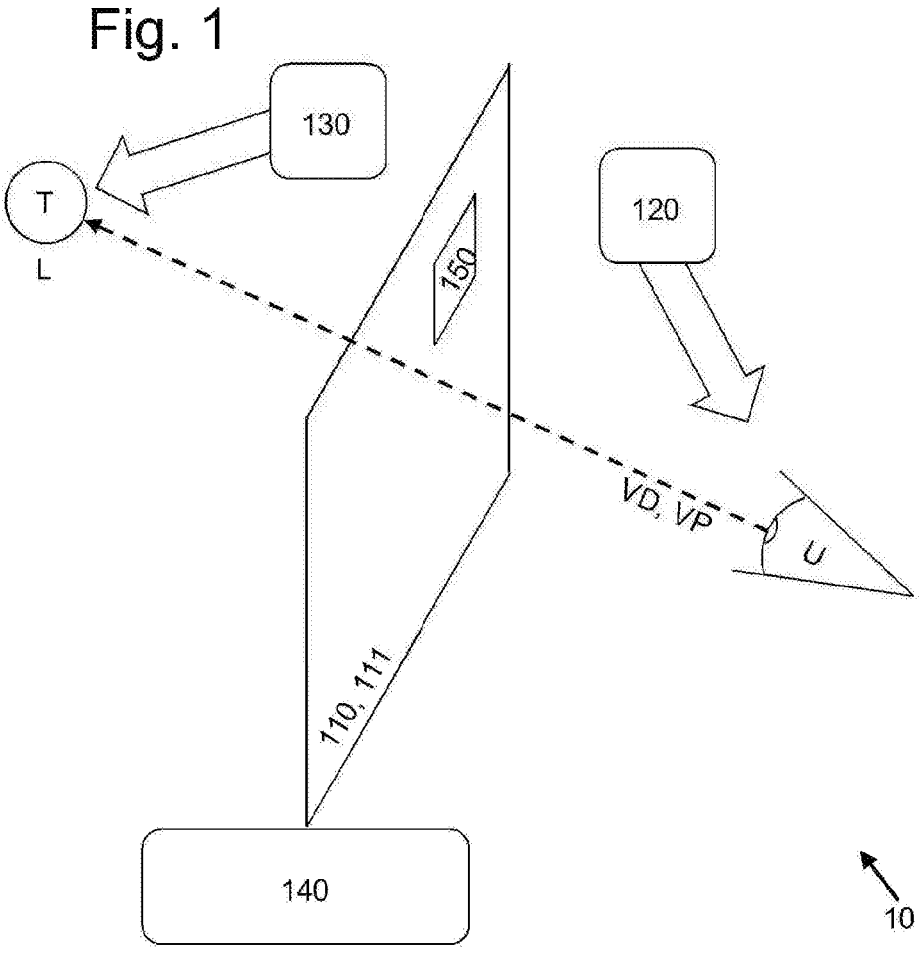
FIG. 1 schematically depicts an apparatus according to an exemplary embodiment.
FIG. 2 schematically depicts a method according to an exemplary embodiment.

FIG. 1 schematically depicts an apparatus 10 according to an exemplary embodiment.

The apparatus 10 comprises:

a display device 110 including an optically transparent display screen 111 for displaying images to a user U;

a sensor 120 configured to track a viewing direction VD and/or a viewing position VP of the user U;

a detector 130 configured to determine a location L of a target T viewable by the user U through the display screen 111; and a controller 140 configured to control the display device 110 to display an image 150 on the display screen 111 at screen coordinates corresponding with the viewable target T, using the tracked viewing direction VD and/or the tracked viewing position VP of the user U and the determined location L of the target T.

FIG. 2 schematically depicts a method according to an exemplary embodiment.

The method is of displaying an image to a user.

At S201, the method comprises tracking a viewing direction and/or a viewing position of the user.

At S202, the method comprises determining a location of a target viewable by the user through an optically transparent display screen.

At S203, the method comprises displaying an image on the display screen at screen coordinates corresponding with the viewable target, using the tracked viewing direction and/or the tracked viewing position of the user and the determined location of the target.

Figure 3A:
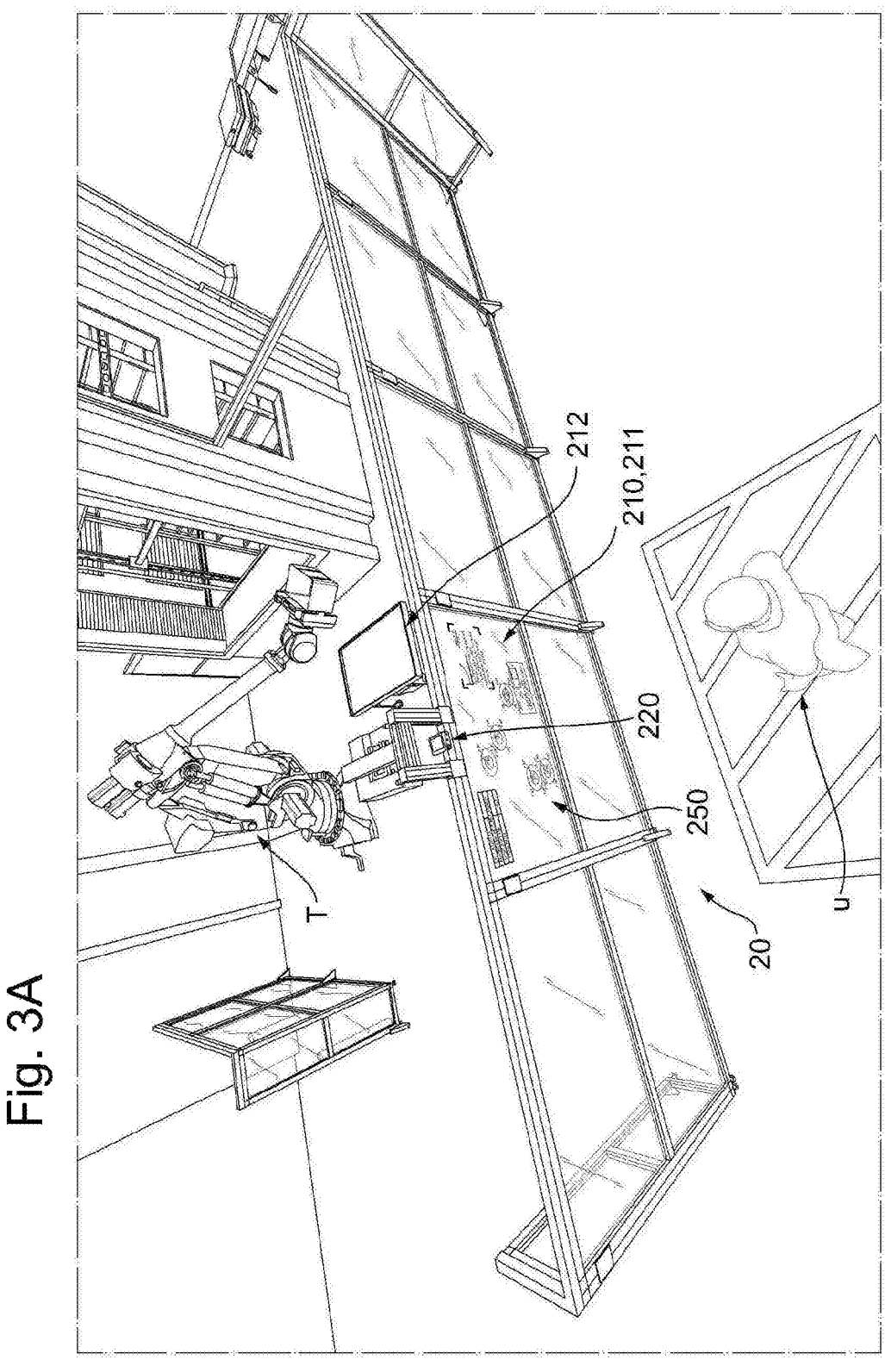
FIG. 3A schematically depicts a plan perspective view of an apparatus according to an exemplary embodiment.
Figure 3B:
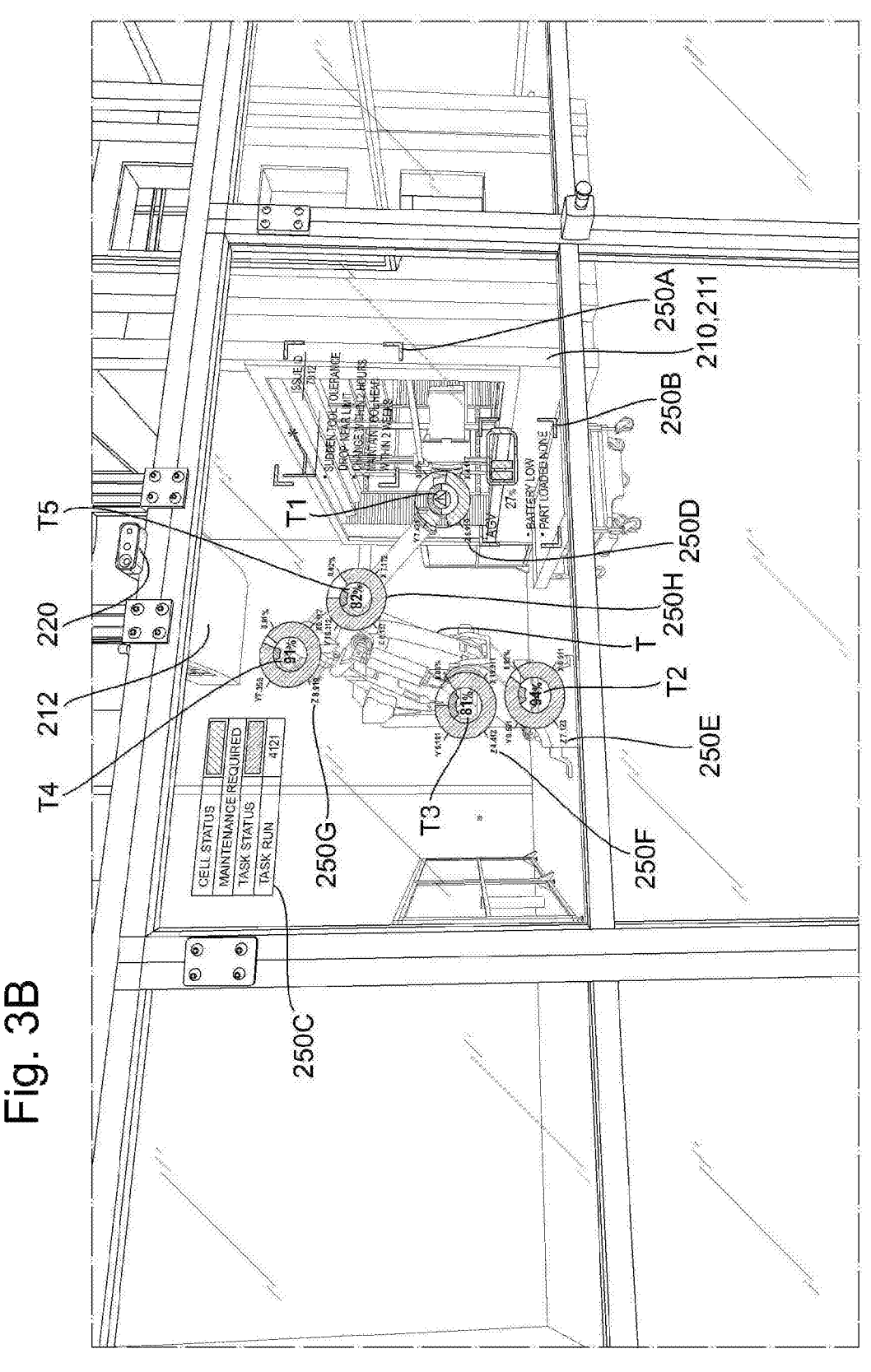
FIG. 3B schematically depicts a front elevation perspective view of the apparatus.

FIG. 3A schematically depicts a plan perspective view of an apparatus according to an exemplary embodiment; and FIG. 3B schematically depicts a front elevation perspective view of the apparatus 20.

The apparatus 20 comprises:

a display device 210 including an optically transparent display screen 211 for displaying images to a user U;

a sensor 220 configured to track a viewing direction VD and/or a viewing position VP of the user U;

a detector 230 (not shown) configured to determine a location L (L1 to L5) of a target T (T1 to T5) viewable by the user U through the display screen 211; and a controller 240 (not shown) configured to control the display device 210 to display an image 250 (250A to 250H) on the display screen 211 at screen coordinates corresponding with the viewable target T (T1 to T5), using the tracked viewing direction VD and/or the tracked viewing position VP of the user U and the determined location L (L1 to L5) of the target T (T1 to T5).

Briefly, FIGS. 3A and 3B show overlaid computer images for a specific tracked user on a large scale by utilising a transparent 'window' for said overlay. This operates the same AR principle as head mounted AR devices, but requires the wearing of no equipment or physical contact by the user whatsoever in order to function. In this example, the images indicate industrial robotic cell status through the projection of individual limb (axis) operational status onto the transparent safety screen that surrounds it, tracking the user's eye location and respective robot location in order to achieve this method.

In this example, the display device 210, the sensor 220, the detector 240 and/or the controller 250 are physically separate, for example in separate housings, and are spaced apart.

In this example, the display screen 211 is a projection screen 211, particularly a rear projection screen 211 and wherein the display device 210 comprises a projector 212 arranged to project the image 250 (250A to 250H) on the display screen 211. In this example, the projection screen 211 comprises and/or is a semi-transparent projection screen 211 having a rear projection film. In this example, the display screen 211 has a diagonal dimension of 1.5 m. In this example, the display screen 211 is adapted to provide a safety screen 211, disposed between the user U and the target T (T1 to T5).

In this example, the display screen 211 encloses, at least in part, the target T (T1 to T5).

In this example, the sensor 220 is configured to track the viewing direction VD and/or the viewing position VP of the user U by sensing a position of the user U's eyes and/or pupils and/or the respective positions of the user U's eyes and/or pupils, using eye location L (L1 to L5) software applied to images, for example camera or video images, of the user U. In this example, the sensor 220 comprises a camera and suitable software. In this example, the sensor 220 is configured to track respective viewing direction VDs and/or the respective viewing position VPs of a plurality of users.

In this example, the detector 240 is communicatively coupled, bidirectionally and wired, to the target T (T1 to T5) and wherein the detector 240 is configured to determine the location L (L1 to L5) of the target T (T1 to T5) based on position data received therefrom. In this example, the target T (T1 to T5) is an industrial robot or part thereof, the industrial robot may output digital readout (DRO) data including locations L (L1 to L5) of axes. In this example, the detector 240 is configured to determine respective locations of a plurality of targets T1 to T5 viewable by the user U through the display screen 211. In this example, the target T (T1 to T5) comprises and/or is an industrial robot or a part thereof.

In this example, the controller 250 is configured to control the display device 210 to repeatedly, for example intermittently, periodically or continuously, calculate the screen coordinates. In this example, the controller 250 is configured to control the display device 210 to display a plurality of images 250 (250A to 250H) on the display screen 211 at respective screen 211 coordinates corresponding with a plurality of viewable targets T (T1 to T5), using the tracked viewing direction VD and/or the tracked viewing position VP of the user U and the respective determined locations L (L1 to L5) of the plurality of targets T (T1 to T5). In this example, the controller 250 comprises a processor and a memory, for example a computer.

It should be understood that generally, the image 250 (250A to 250H) is associated with the target T (T1 to T5), for example computer-generated visual information about the target T (T1 to T5). In this example, the image 250 (250A to 250H) comprises and/or is text and/or a graphic.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An apparatus comprising:
   a display device including an optically transparent display screen for displaying images to a user;
   a sensor configured to track a viewing direction and/or a viewing position of the user;
   a detector configured to determine a location of a target viewable by the user through the display screen; and
   a controller configured to control the display device to display an image on the display screen at screen coordinates corresponding with the viewable target, using the tracked viewing direction and/or the tracked viewing position of the user and the determined location of the target,
   wherein the display screen is adapted to provide a safety screen, disposed between the user and the target,
   wherein the detector is communicatively coupleable to the target and the detector is configured to determine the location of the target based on position data received therefrom,
   wherein the apparatus comprises the target,
   wherein the target is an industrial robot,
   wherein the sensor is configured to track the viewing direction and/or the viewing position of the user and the detector is configured to determine the location of the target at a resolution, a precision, and/or with an accuracy sufficient to calculate screen coordinates for the image, and wherein the image indicates individual limb operational status of the industrial robot.

2. The apparatus according to claim 1, wherein the controller is configured to control the display device to display a plurality of images on the display screen at respective screen coordinates corresponding with a plurality of viewable targets, using the tracked viewing direction and/or the tracked viewing position of the user and the respective determined locations of the plurality of targets.

3. The apparatus according to claim 1, wherein the display screen comprises a projection screen and wherein the display device comprises a projector arranged to project the image on the display screen.

4. The apparatus according to claim 1, wherein the display device comprises and/or is a stereo display device.

5. The apparatus according to claim 4, wherein the display screen encloses, at least in part, the target.

6. The apparatus according to claim 1, wherein the sensor comprises a camera.

7. The apparatus according to claim 1, wherein the detector comprises a software sensor, configured to read, infer and/or calculate the location of the target using the position data received therefrom.

8. The apparatus according to claim 1, wherein the detector is configured to determine respective locations of a plurality of targets and/or one or more parts thereof, viewable by the user through the display screen.

9. The apparatus according to claim 1, comprising an identifier configured to establish an identity of the user and wherein the controller is configured to control the display device to display the image based on the established identity.

10. The apparatus according to claim 1, comprising a user input device configured to receive an input from the user.

11. The apparatus according to claim 10, wherein the user input device comprises a gesture sensor and/or wherein the display screen comprises a touch screen.

12. The apparatus according to claim 10, wherein the controller is configured to control the target according to the input received from the user.

13. The apparatus according to claim 1, wherein the sensor is configured to track the viewing direction and/or the viewing position of the user by sensing a position of the user's eyes and/or pupils and/or the respective positions of the user's eyes and/or pupils.

14. The apparatus according to claim 13, wherein the sensor is configured to track respective viewing directions and/or the respective viewing positions of a plurality of users.

15. The apparatus according to claim 1, wherein the detector is communicatively coupled to the target and wherein the detector is configured to determine the location of the target based on position data received therefrom.

16. A method of displaying an image to a user, the method comprising:
   tracking a viewing direction and/or a viewing position of the user;
   determining a location of a target viewable by the user through an optically transparent display screen based on position data received therefrom at a resolution, a precision, and/or with an accuracy sufficient to calculate screen coordinates for the image; and
   displaying an image on the display screen at the screen coordinates corresponding with the viewable target, using the tracked viewing direction and/or the tracked viewing position of the user and the determined location of the target, wherein the display screen is adapted to provide a safety screen, disposed between the user and the target, wherein the target is an industrial robot, wherein the safety screen is configured to prevent the user from contacting the target and/or vice versa, and wherein the image indicates individual limb operational status of the industrial robot.

17. An apparatus comprising:

a display device including an optically transparent display screen for displaying images to a user;

a sensor configured to track a viewing direction and/or a viewing position of the user;

a detector configured to determine a location of a target viewable by the user through the display screen; and a controller configured to control the display device to display an image on the display screen at screen coordinates corresponding with the viewable target, using the tracked viewing direction and the tracked viewing position of the user and the determined location of the target, wherein the display screen is adapted to provide a safety screen, disposed between the user and the target, wherein the detector is configured to determine the location of the target at a resolution, a precision, and/or with an accuracy sufficient to calculate screen coordinates for the image, wherein the target is an industrial robot, wherein the safety screen is configured to prevent the user from contacting the target and/or vice versa, and wherein the image indicates individual limb operational status of the industrial robot.

18. The apparatus of claim 17, wherein the location of the target is a location relative to a coordinate system.

19. The apparatus of claim 17, wherein the location of the target is a geographic location.

* * * * *